(12) United States Patent
Lv et al.

(10) Patent No.: US 12,399,617 B2
(45) Date of Patent: Aug. 26, 2025

(54) DISPLAYING A REMOTE DESKTOP WITH CONTROLLABLE TRANSPARENCY

(71) Applicant: Omnissa, LLC, Mountain View, CA (US)

(72) Inventors: Lin Lv, Beijing (CN); Yunxia Cheng, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 18/128,248

(22) Filed: Mar. 30, 2023

(65) Prior Publication Data
US 2024/0231609 A1 Jul. 11, 2024

(30) Foreign Application Priority Data
Jan. 9, 2023 (WO) ................ PCT/CN2023/071250

(51) Int. Cl.
*G06F 3/0489* (2022.01)
(52) U.S. Cl.
CPC .................................. *G06F 3/0489* (2013.01)
(58) Field of Classification Search
CPC .............................. G06F 3/0489; G06F 3/0481
See application file for complete search history.

(56) References Cited

U.S. PATENT DOCUMENTS

| | | | | |
|---|---|---|---|---|
| 11,734,032 B1* | 8/2023 | Brinkhoff | ............. | G06F 3/0481 |
| | | | | 715/204 |
| 2005/0278648 A1* | 12/2005 | Taylor | ................ | H04N 5/44504 |
| | | | | 725/38 |
| 2012/0324365 A1* | 12/2012 | Momchilov | .............. | G06F 3/14 |
| | | | | 715/738 |
| 2015/0188973 A1* | 7/2015 | Kacmarcik | ........... | H04L 67/131 |
| | | | | 715/719 |
| 2021/0397464 A1* | 12/2021 | Lv | ........................... | G06F 9/452 |
| 2023/0236702 A1* | 7/2023 | Singh | .................... | G06F 3/0354 |
| | | | | 715/790 |

OTHER PUBLICATIONS

Jiewei Wu et al., SRIDESK: A Streaming based Remote Interactivity Architecture for Desktop Virtualization System, Jul. 1, 2013, IEEE Symposium on Computers and Communications, pp. 000281-000286 (Year: 2013).*
Miika Komu et al., Power Consumption in Remote Gaming: an Empirical Evaluation, Apr. 1, 2016, IEEE Conference on Computer Computatins Workshops, pp. 1-6 (Year: 2016).*
Github, Inc., "The Live Transcribe Speech Engine", available at <URL: https://github.com/google/live-transcribe-speech-engine>, Apr. 22, 2021, 14 pages.
Github, Inc., "AutoLingo", available at <URL: https://github.com/AutoLingo/autolingo>, Apr. 21, 2017, 4 pages.
(Continued)

*Primary Examiner* — Tam T Tran
(74) *Attorney, Agent, or Firm* — Kim & Stewart LLP

(57) ABSTRACT

A remote desktop can be displayed with controllable transparency over a local desktop. The transparency may be varied using hotkeys. Hotkeys may also be used to control/switch the direction of user input, such as mouse and keyboard events, so as to direct the user input to the remote desktop or to the local desktop.

21 Claims, 10 Drawing Sheets

(56) References Cited

OTHER PUBLICATIONS

Microsoft, Inc., "Programming reference for the Win32 API", available at <URL: https://learn.microsoft.com/en-us/windows/win32/api/>, 2023, 6 pages.
Non-Published Commonly Owned U.S. Appl. No. 18/128,247 (1348), Filed on Mar. 30, 2023, 42 pages, VMware, Inc.
Non-Published Commonly Owned U.S. Appl. No. 18/119,293 (1399), Filed on Mar. 9, 2023, 43 pages, VMware, Inc.

* cited by examiner

DISPLAYING A REMOTE DESKTOP WITH CONTROLLABLE TRANSPARENCY

CROSS-REFERENCE TO RELATED APPLICATIONS

The present application claims the benefit of Patent Cooperation Treaty (PCT) Application No. PCT/CN2023/071250, filed Jan. 9, 2023. The present application is also related in subject matter to U.S. patent application Ser. No. 18/119,293, filed Mar. 9, 2023, and to U.S. patent application Ser. No. 18/128,247, filed Mar. 30, 2023. The above PCT application and US patent applications are incorporated herein by reference in their entirety.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a remote desktop to run on VMs that are provided by a hypervisor on a host. A user/client uses the operating system (OS) and applications (which reside and execute at the VM) via an endpoint device (local client device or local user device) of the user, just as if the OS/applications were actually running locally on the endpoint device, when in reality the OS/applications are running on the remote desktop.

Working remotely on a regular or occasional basis, such as via remote desktops rendered on laptops (or other endpoint device), has become common due to the flexibility and convenience. When a user is using a remote desktop displayed on a laptop or other endpoint device, the user has to switch from time to time between the remote desktop and the local desktop of the laptop. For example, the user may have some tasks that need to be performed on the local desktop and other tasks that need to be performed on the remote desktop. Concurrently operating the local desktop and the remote desktop on the same display screen can be a difficult and frustrating experience for users.

DETAILED DESCRIPTION

Figure 1:
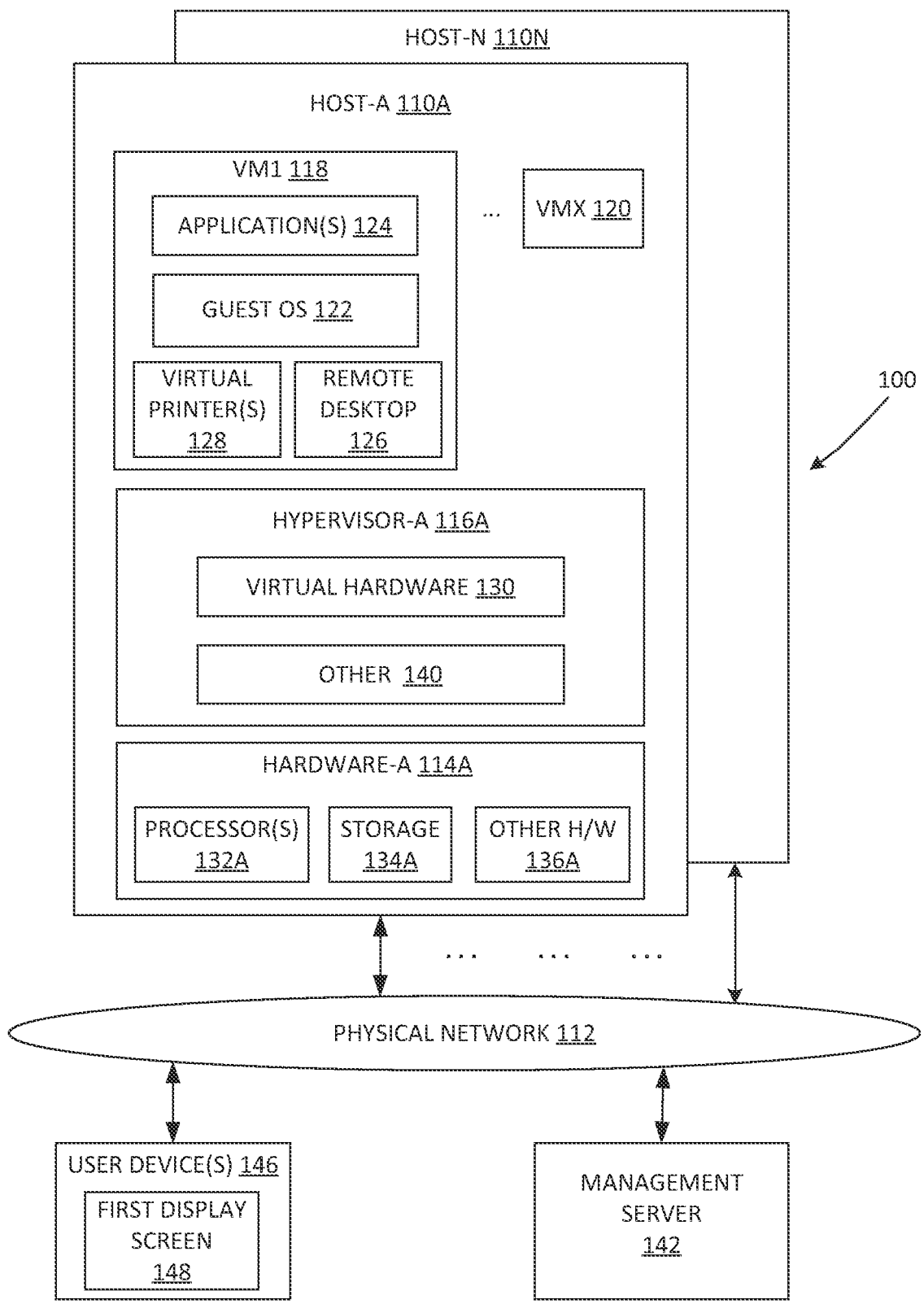
FIG. 1 is a schematic diagram illustrating an example virtualized computing environment that can implement a virtual desktop infrastructure (VDI) having capability to enable the display of a remote desktop with controllable transparency.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks associated with concurrently operating a remote desktop and a local desktop on a display screen of a local client device (user device). For example and as previously explained above, a user may wish to switch between the remote desktop and the local desktop when performing tasks, in that some tasks need to be performed on the remote desktop and some other tasks need to be performed on the local desktop. As an illustration, the user may be composing an email using an email application provided by the remote desktop and needs to copy and paste content (into the email) from a document that is provided by a local word processing application on the local desktop. The user may also need to repeatedly view the document on the local desktop during the course of composing the email on the remote desktop, as well as copying/pasting from the document to the email.

The above scenario involves repeatedly switching the display screen on the local client device, from displaying the remote desktop to displaying the local desktop, and vice versa. Switching back and forth between displaying the local desktop and the remote desktop, on the same display screen and under these circumstances, can be difficult and frustrating for the user. For example, the display screen of a local client device (such as a laptop) is often small and so can only display either the maximized remote desktop or the local desktop, one at a time, in order for the contents of these desktops to have a size that is sufficiently viewable by the user. If the display screen attempts to display both the local desktop and the remote desktop simultaneously/concurrently, such as by resizing the remote desktop so as to be displayed as a reduced-sized window over (e.g., on top of) or next to the local desktop, then the reduced-size of the remote desktop makes its contents difficult to see on the small screen of the laptop. Furthermore, even the reduced-size remote desktop could cover (e.g., obfuscate) some portion of the underlying local desktop anyways, thereby also continuing to require the user to switch back and forth repeatedly between displaying the local desktop and the remote desktop in order to view/access contents from each desktop.

The embodiments disclosed herein enable a user to view a local desktop (e.g., a local application provided via the local desktop) and a remote desktop (e.g., a remote application provided via the remote desktop) at the same time on a same display screen of a local client device, when the user is operating the local client device and/or when only a single display screen is available to present both desktops. The disclosed embodiments address the above-described drawbacks, by making the remote desktop (e.g., remote display) transparent, so that the user can see both the overlying remote desktop and the underlying local desktop (e.g., the local application(s) provided by the local desktop) at the same time when the local client device is connected in a remote desktop session. Furthermore, the transparency of the remote desktop is adjustable/controllable/variable, and so the user can easily modify the transparency of the remote desktop to get a desired visual effect. Also, the users can easily control the direction to which mouse and keyboard events are to be applied (e.g., applied to the remote desktop or to the local desktop) in the manner that will be described further below.

Presentation of a Remote Desktop with Controllable Transparency

Figure 3:
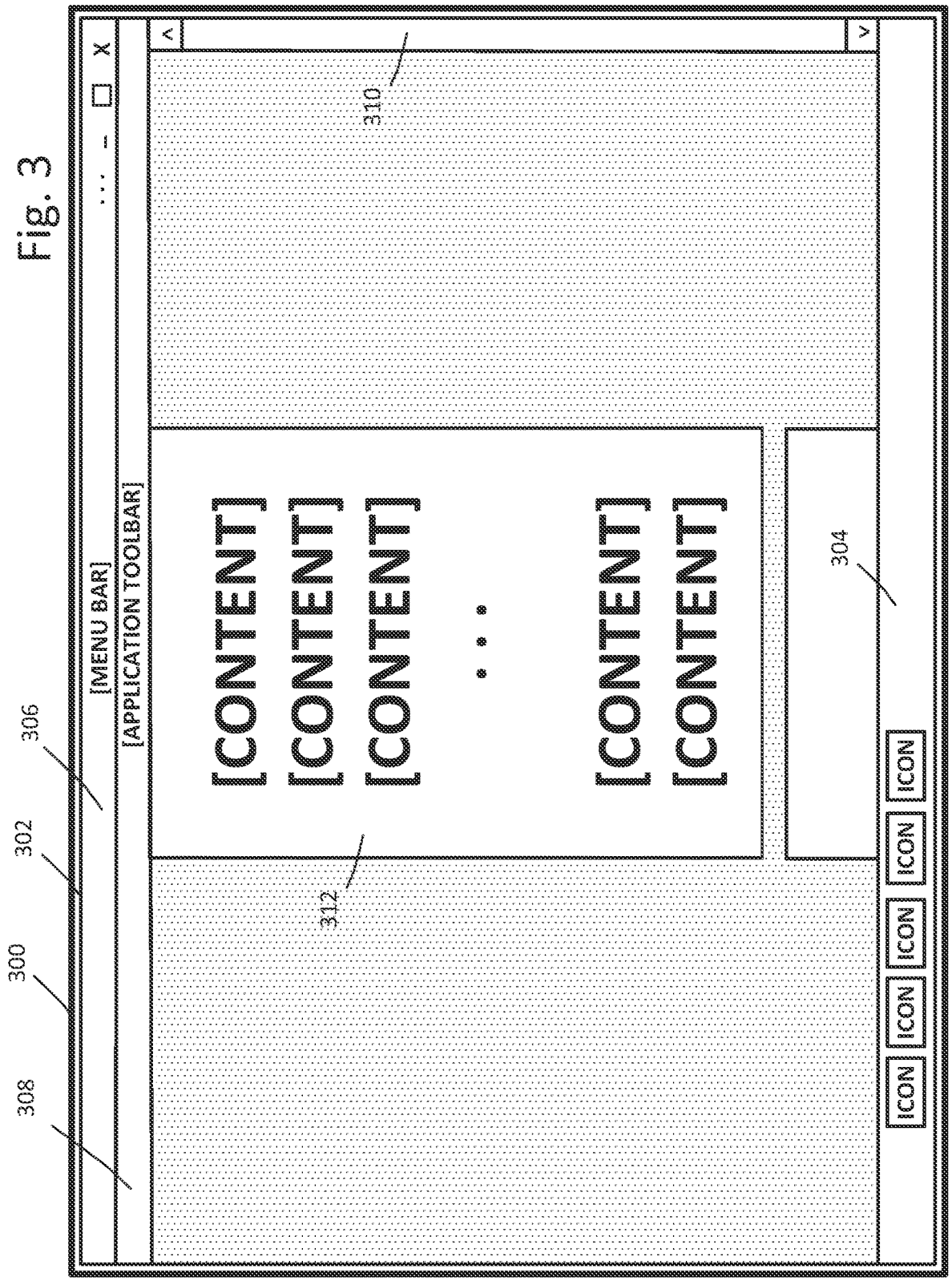
FIG. 3 is a diagram illustrating a display screen that is rendering a remote desktop.

FIG. 3 is a diagram illustrating a display screen 300 that is rendering a remote desktop 302. Specifically, the user's local client device has logged into a remote desktop session and is using the display screen 300, which is a primary display screen of the local client device (or a secondary display screen), to render the remote desktop 302 as a remote display, which may include one or more bars, such as a task bar 304 and other graphics. The remote desktop 302 may be maximized and so fully occupies the real estate of the display screen 300.

A remote application (such as Microsoft Word), which is being accessed and used by the user via the remote desktop 302, is maximized and so fully occupies the real estate of the remote desktop 302. The remote application may display/include one or more bars (such as a menu bar 306, a tool bar 308, and a scroll bar 310) and a file (such as pages of a Microsoft Word document 312) that displays content.

While FIG. 3 depicts an example of a document 312 of a remote application that is presented via the remote desktop 302 on the display screen 300, analogous situations may occur with other applications, tools, etc. that are used via the remote desktop 302. For instance, a web page (or other file/content provided by the remote desktop 302) may be rendered on the display screen 300.

Figure 4:
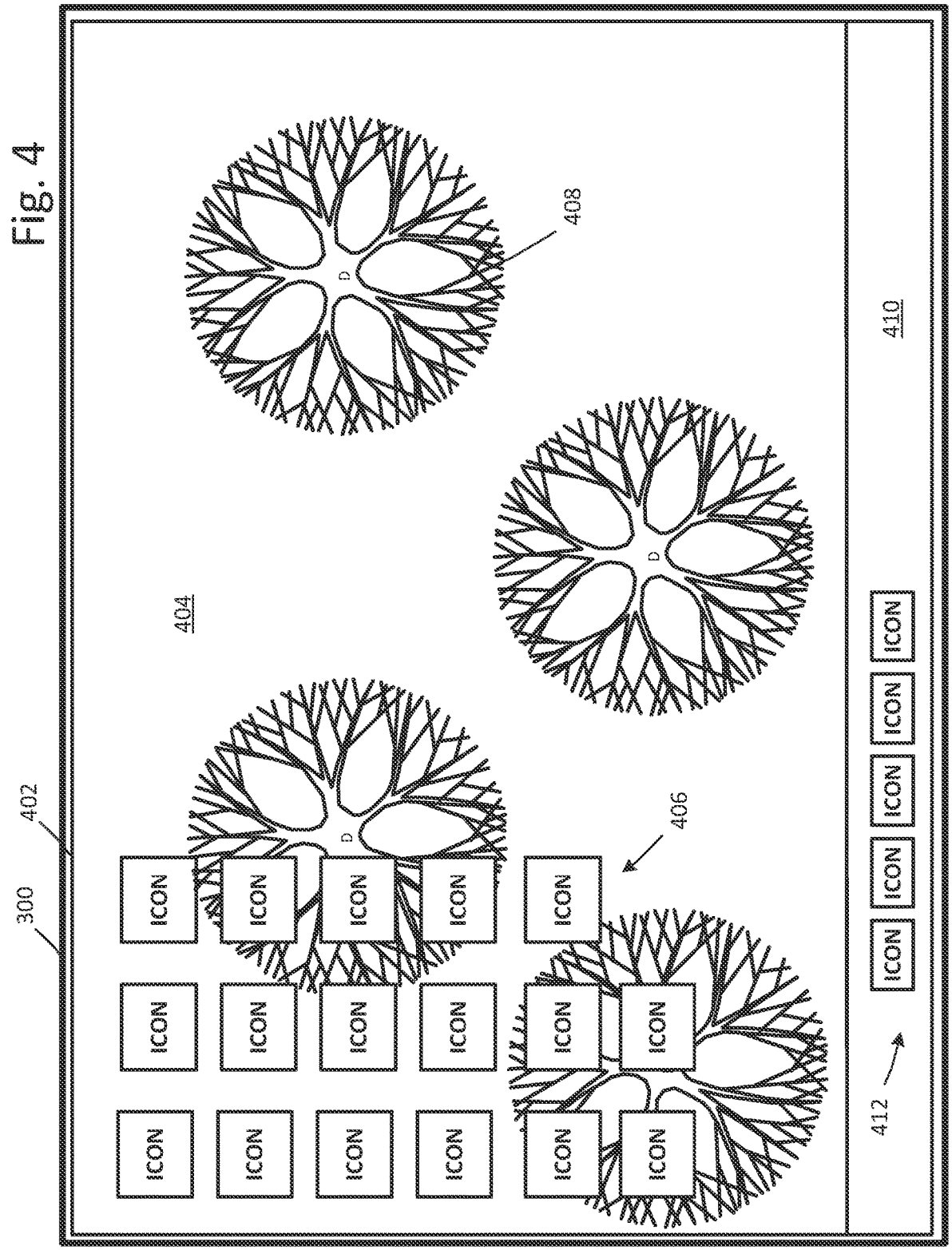
FIG. 4 is a diagram illustrating the display screen that is rendering a local desktop.

Turning now to FIG. 4, FIG. 4 is a diagram illustrating the display screen 300 that is rendering a local desktop 402. For example, the user may operate the local client device during a remote desktop session so as to switch the display screen 300 between displaying the remote desktop 302 of FIG. 3 and displaying the local desktop 402 of FIG. 4. Also, FIG. 4 may depict a situation when the local client device has logged out of a remote desktop session and so is now displaying (only) the local desktop 402.

The local desktop 402 may include a display area 404. In the example of FIG. 4, no local applications are currently open, and so the local desktop 402 displays a plurality of icons 406 and one or more screen saver images 408 in the display area 404. If a local application is currently open, a page, document, file, window, etc. of the local application would be displayed in the display area 404 of the local desktop 402. The local application may be maximized or may have a reduced-size when displayed in the display area 404.

The local desktop 402 may also include a task bar 410. A plurality of icons 412 (e.g., short cuts) may be presented in the task bar 410. These are just but a few examples of the types of content that may be presented via the local desktop 402.

Figure 5:
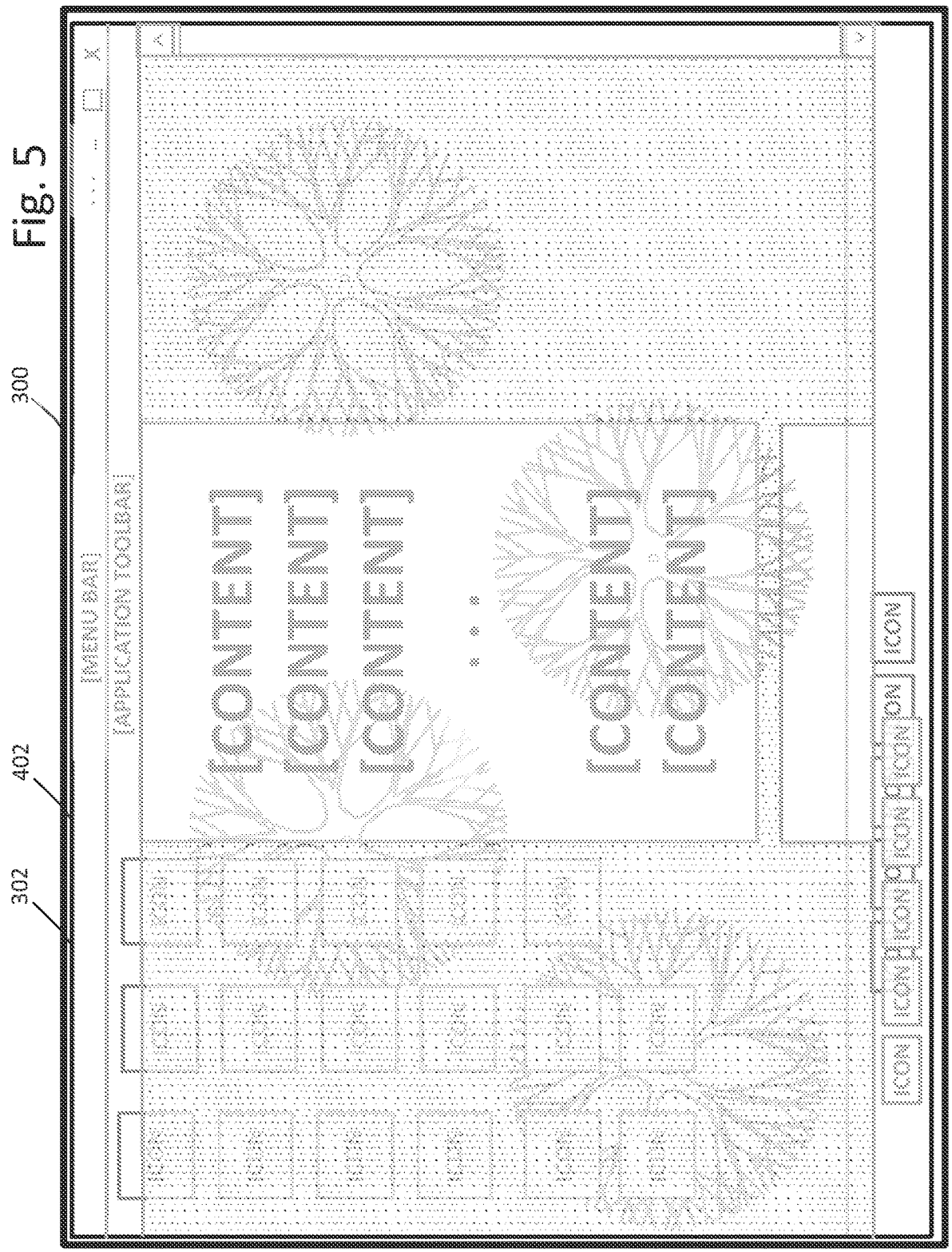
FIG. 5 is a diagram illustrating the display screen of FIGS. 3 and 4 that is rendering a transparent remote desktop over a local desktop.

FIG. 5 is a diagram illustrating the display screen 300 of FIGS. 3 and 4 that is now rendering a transparent remote desktop over a local desktop, specifically the remote desktop 302 of FIG. 3 is now rendered in transparent form on top of (e.g., is superimposed over) the local desktop 402 of FIG. 4. The window of the remote desktop 302 is maximized in FIG. 4, so as to fully overlap the local desktop 402 on the display screen 300.

The amount or level of transparency of the image of the remote desktop 302 can be set by the user to be between a range between 0% and 100%, with the image of the remote desktop 302 being invisible at 100% transparency (e.g., the underlying local desktop 402 is fully visible) and no transparency of the image of the remote desktop 302 at 0% transparency (e.g., the underlying local desktop 402 is invisible or fully obfuscated). The user may set a particular transparency, for example, dependent upon the amount of attention or distraction that the user wishes for the remote desktop 302 or local desktop 402 or other desired visual effect.

In the example of FIG. 5, the transparency of the remote desktop 302 has been set to a transparency level such as 50% transparency, and so the visibility of the remote desktop 302 is between invisible and no transparency. As depicted in FIG. 5 for this example transparency, contents of both the remote desktop 302 and the local desktop 402 could be visible at roughly the same visibility level. This 50% transparency is symbolically represented in FIG. 5 by gray lines, text, shading, images, etc. for the remote desktop 302 and for the local desktop 402, which are lighter in shade relative to the darker black lines, text, shading, images, etc. for the remote desktop 302 and for the local desktop 402 in respective FIGS. 3 and 4. The transparency level may be adjusted so as to make one desktop more visible relative to the other desktop.

Figure 6:
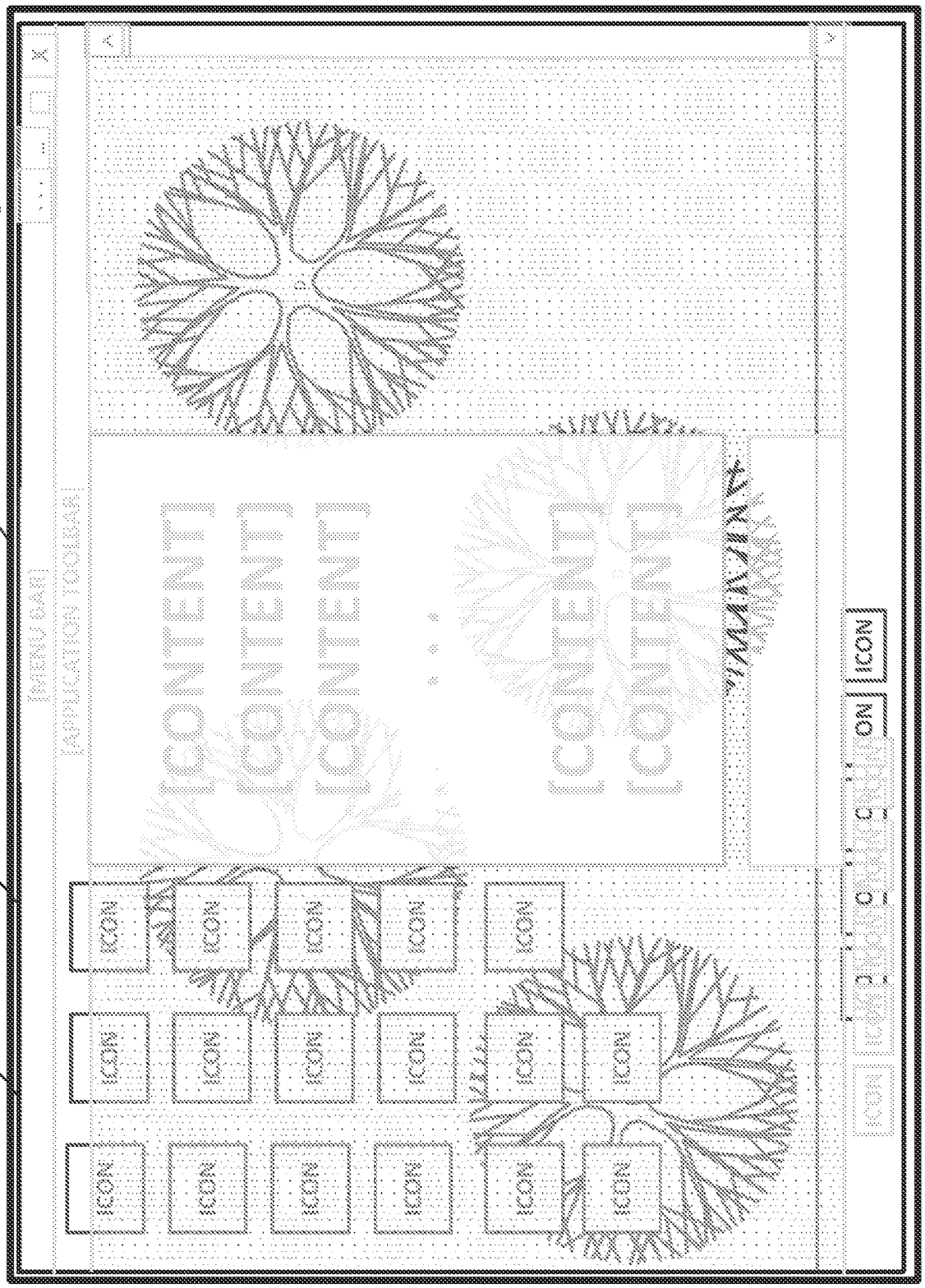
FIG. 6 is a diagram illustrating the display screen of FIGS. 3 and 4 that is rendering the transparent remote desktop over the local desktop at a different transparency level than that of FIG. 5.

For example, FIG. 6 is a diagram illustrating the display screen 300 that is rendering the transparent remote desktop 302 over the local desktop 402 at a different transparency level than that of FIG. 5. In FIG. 6, the transparency of the remote desktop 302 has been set to an even higher transparency such as 75% transparency, and so the visibility of the remote desktop 302 is approaching invisibility at 100% transparency. With this transparency level and as compared to FIG. 5, the local desktop 402 is more readily visible relative to the remote desktop 302, which is less visible (e.g., more difficult to see) due to its higher transparency level. This 75% transparency is symbolically represented in FIG. 6 by gray lines, text, shading, images, etc. for the remote desktop 302, which are still lighter in shade relative to the gray lines, text, shading, images, etc. for the remote desktop 302 in FIG. 5, while the lines, text, shading, images, etc. for the local desktop 402 of FIG. 6 are darker in shade relative to the lines, text, shading, images, etc. for the local desktop 402 of FIG. 5.

In some embodiments, the transparency level of the entire remote desktop 302 may be uniform (e.g., all parts of the remote desktop 302 are at the same transparency level). In other embodiments, different parts of the remote desktop 302 may have corresponding different transparencies. For example, a document may have a different transparency level than a menu bar, scroll bar, task bar, or unoccupied region of the remote desktop 302. Thus, some parts of the remote desktop may be more visible than other parts, depending on their respective transparency levels.

Figure 7:
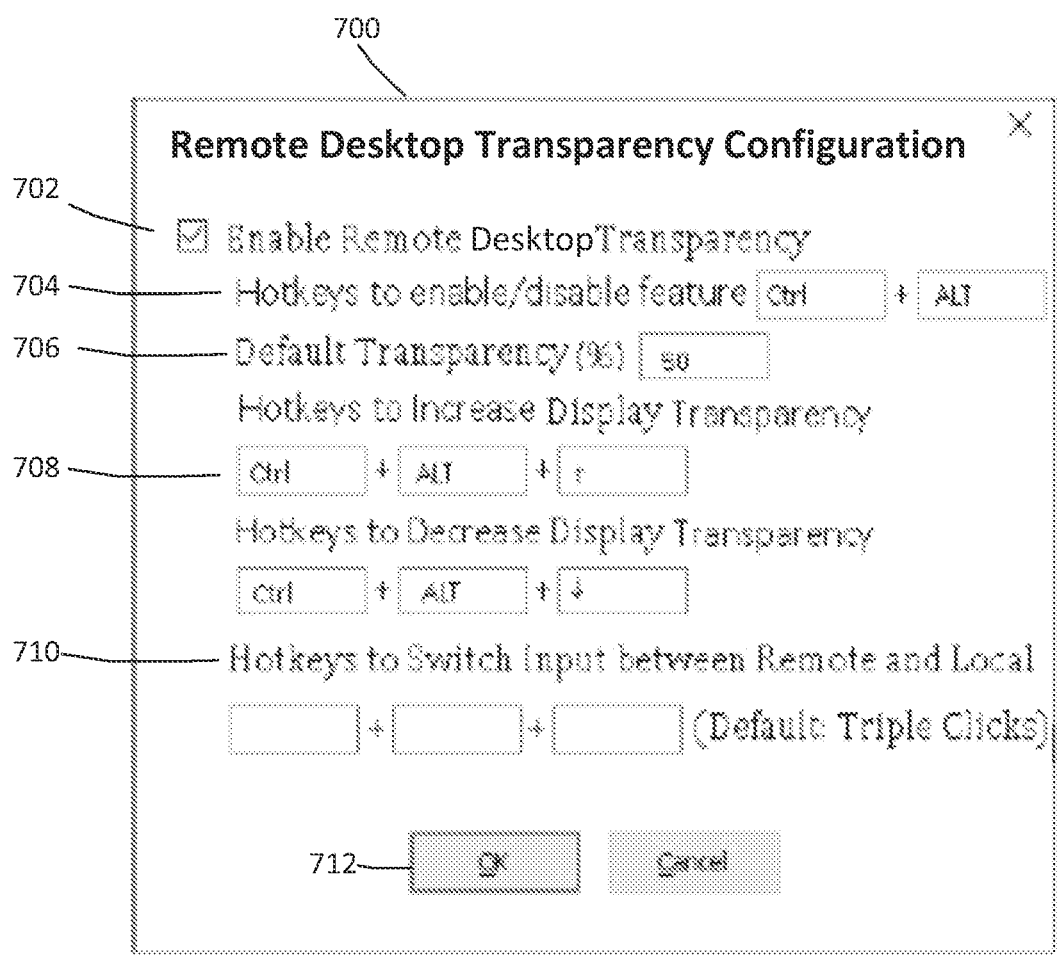
FIG. 7 shows an example user interface window that may be used to enable and configure transparency in the presentation of a remote desktop.

FIG. 7 shows an example user interface (UI) window 700 that may be used to enable and configure transparency in the presentation of a remote desktop, such as the remote desktop 302 depicted in FIGS. 5 and 6. The user may access the UI window 700 by launching client software (e.g., a remote desktop application that is installed in the local client device) and then opening the UI window 700 via a configuration menu selection or other configuration option.

The UI window 700 may present various UI elements, such as selection boxes, fillable fields, menus, prompts, buttons, etc. For example, the UI window 700 may include a UI element 702 that may be used by the user to enable or disable the feature of being able to transparently present/display a remote desktop on the display screen 300. Alternatively or additionally, a UI element 704 enables the user to specify hotkeys (e.g., CTRL and ALT keys) that may be actuated to enable or disable transparency in the presentation of the remote desktop.

The user may specify the level of transparency of an image (remote display) of the remote desktop via a UI element 706. UI elements 708 enable the user to specify hotkeys for changing/adjusting the transparency of the image of the remote desktop. For example, the user may specify CTRL+ALT+arrow up keys as the hotkeys to increase the image transparency, and CTRL+ALT+arrow down keys as the hotkeys to decrease the image transparency.

A UI element 710 may be provided to enable the user to select hotkeys that control the direction of an input (e.g., mouse and keyboard presses/events) to the local desktop 402 or to the remote desktop 302. These hotkeys, if pressed/actuated, inform the remote desktop application (remote desktop client) at the local client device to switch the direction of the input from one desktop to the other desktop, so that subsequent input (e.g., keyboard and mouse presses/events) are applied to the appropriate/correct desktop, until the hotkeys are pressed/actuated again to switch the direction of the input. If no other hotkeys are configured to be used for switching input, three clicks of a right mouse button may be the default hotkeys as an example. Three clicks may be detected, for example, if three consecutive mouse clicks are detected at the same location on the display screen 300 within a particular period of time (e.g., within 1 second or less).

As an illustration, the desktop window (rendered on the display screen 300) that is currently receiving user input (e.g., keyboard and mouse events) may be the remote desktop 302, which is displaying an email that the user is composing. Then, if the user wishes to switch the direction of input to the local desktop 402, which is displaying a word processing document, the user can perform three mouse clicks on the window of the remote desktop 302. These three mouse clicks change the direction of subsequent input (e.g., mouse and keyboard events) from the remote desktop 302 to the local desktop 402. Thus, subsequent user inputs, such as to type text into the word processing document, to perform copy/paste on the word processing document, etc. are directed to the word processing document displayed on the local desktop 402. When the user subsequently performs three mouse clicks on the window of the local desktop 402 (e.g., clicks three times on the word processing document), then these three mouse clicks trigger a switch back of the direction of subsequent mouse and keyboard events to the remote desktop 302.

By default in some embodiments, the keyboard and mouse events are directed/redirected to the remote desktop 302 when the local client device is connected to a remote desktop session, and the remote desktop 302 is the topmost window. The direction of keyboard and mouse events are ignored by the remote desktop client, so that these events go to the local OS and are captured by the topmost local application, when the user clicks the hotkeys (e.g., the three mouse clicks in the example above) to switch the direction of keyboard and mouse events from the remote desktop 302 to the local desktop 402. Clicking such hotkeys again direct the mouse and keyboard events back to the remote desktop 302.

With this feature, the user can input text etc. on local applications without minimizing the window of the remote desktop 302, or the user can input text etc. on the remote desktop 302 while reading a document opened on the local desktop 402. By leveraging remote desktop tools, such as a clipboard redirection, the user can easily copy text/files/folders from the local desktop 402 to the remote desktop 302 (or vice versa) without having to perform switching the display of desktops between the local desktop 402 and the remote desktop 302. Thus, with this feature, the efficiency and user experience of working on a remote desktop are improved substantially.

The foregoing example illustrates the use of three mouse clicks as the default hotkeys for switching the direction of inputs. As explained above, the UI element 710 can be used to configure other hotkeys as for switching the direction inputs (e.g., mouse and keyboard events). Other possible examples of UI elements for the UI window 700 may be provided.

After the user clicks an OK button 712 to complete the configuration, the feature of displaying a transparent remote desktop on top of a local desktop is configured and enabled. When the user connects the local client device to a remote desktop session, the user sees the remote desktop 302 transparently displayed over the local desktop 402, such as when the user presses hotkeys to activate (e.g., turn on) the feature. Hotkeys may be pressed to turn off the feature, if desired.

To assist in further explaining the details of how a remote desktop may be presented on the display screen 300 with controllable transparency, on top of a local desktop during a remote desktop session, a description is provided next below regarding a computing environment and client and agent components that may be provided to support the capability to present remote desktop with such controllable transparency.

Computing Environment

FIG. 1 is a schematic diagram illustrating an example virtualized computing environment 100 that can implement a virtual desktop infrastructure (VDI) having capability to enable the display of a remote desktop with controllable transparency. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120, wherein X (as well as N) is an integer greater than or equal to 1. In practice, the virtualized computing environment 100 may include any number of hosts (also known as computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be an agent-side VM that includes a guest operating system (OS) 122 and one or more guest applications 124 (e.g., remote applications and their corresponding processes) that run on top of the guest OS 122. Using the guest OS 122 and/or other resources of VM1 118 and the host-A 110A, VM1 118 may generate one or more remote desktops 126 (e.g., the remote desktop 302 or other virtual desktops) that is operated by and accessible to one or more client-side user device(s) 146 (e.g., a local client device) via the physical network 112. One or more virtual printers 128 also may be instantiated in VM1 118 and/or elsewhere in the host-A 110A, and may correspond to one or more physical printers (not shown) connected to the user device 146 at the client side. VM1 118 may include other elements, such as code and related data (including data structures), engines, etc., which will not be explained herein in further detail, for the sake of brevity. The user device 146 may include a first display screen 148 and other components (explained in more detail in FIGS. 2 and 8) to support the use of the user device 146 in cooperation with the virtual desktop 126 and other elements of VM1 118. The first display screen 148 or some other display screen may render the UI window 700 of FIG. 7 when the user device 146 launches a remote desktop application. The first display screen 148 may be the display screen 300 in various embodiments.

According to various embodiments, VM1 118 may operate as an agent that provides the remote desktop 126 (and other remote desktop features) to one or more of the user device 146. For instance, the agent can cooperate with client software (referred to at times herein as a remote desktop application, client application, remote desktop client, or client, installed at the user device 146) to establish and maintain a remote desktop connection between VM1 118 and the user device 146 for purposes of enabling the user to operate the user device 146 in order to access and use the remote desktop 126. In some embodiments, the agent can be a sub-component of VM1 118. Examples of the agent and client software are the Horizon agent and the Horizon client, respectively, of VMware, Inc. of Palo Alto, California. One or more connection servers 216 (shown in FIG. 2) can broker or otherwise manage communications between the agent (e.g., a Horizon agent or other analogous remote desktop agent) and the client software (e.g., a Horizon client or other analogous remote desktop client) over a VDI connection 208 (also shown in FIG. 2) provided by the physical network 112. A management server 142 and/or other server(s)/device(s) can operate as the connection server in some implementations.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A may include other elements (shown generally at 140), including tools to provide resources for and to otherwise support the operation of the VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and remote application(s) in the virtual machine, such as the guest OS 122 and the guest application(s) 124 (e.g., a word processing application, accounting software, a browser, etc.) in VM1 118. Corresponding to the hardware 114A, the virtual hardware 130 may include a virtual CPU, a virtual memory, a virtual disk, a virtual network interface controller (VNIC), etc.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
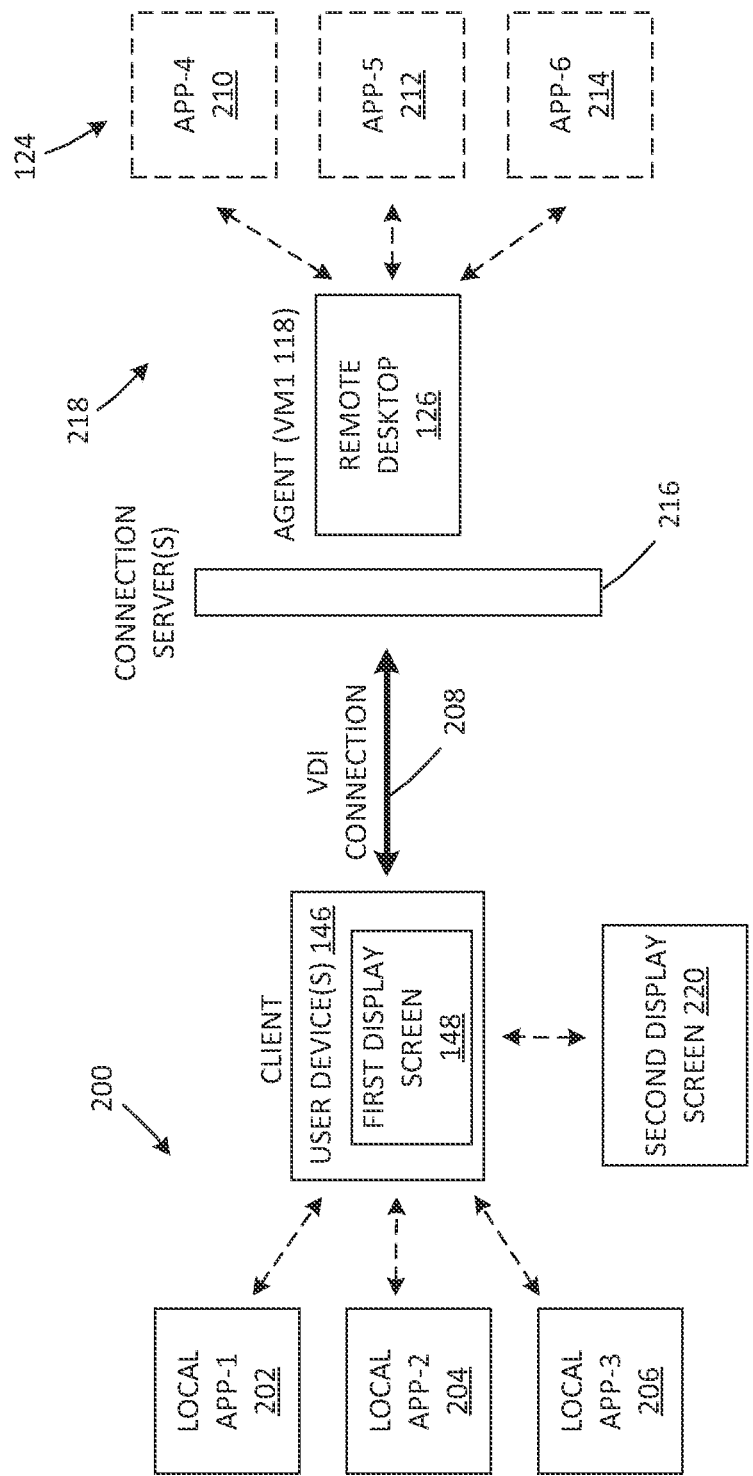
FIG. 2 is a schematic diagram illustrating client and agent devices for the virtualized computing environment of FIG. 1.

FIG. 2 is a schematic diagram illustrating client and agent devices for the virtualized computing environment 100 of FIG. 1. More specifically, FIG. 2 shows a client (e.g., a Horizon client or other analogous remote desktop client running on the user device 146), an agent (e.g., the VM1 118 and/or a component thereof, such as a Horizon agent or other analogous remote desktop agent, that provides the remote desktop 126 and which runs on a host), and their associated remote applications that may be displayed on their respective remote desktops (remote displays).

At a client side 200, the user device 146 may have local applications (APPs) installed on it. These applications may include a local APP-1 202, a local APP-2 204, a local APP-3 206, etc. These local applications (e.g., their respective icons or launched files/interfaces) may in turn be presented on a local desktop (e.g., the local desktop 402) rendered on the first display screen 148 (e.g., the display screen 300) of the user device 146. Examples of these local applications may include but not be limited to Slack, Microsoft Teams, Microsoft Outlook, and/or other types of messaging/collaboration applications, as well as other locally installed applications such as a calendar application, word processing application, spreadsheet application, games, browser, etc.

One or more additional (second) display screens 220 may be connected to the user device 146. The display screen 220 may have a larger display area than the first display screen 148. A remote desktop and its applications may be displayed on either or both of the display screens 148 and 220, concurrently with or without a local desktop and its local applications/content also being displayed. The user may select one of the display screens 148 and 220 to be a primary display screen, and may select the other display screen to be a secondary display screen. In some embodiments, the transparent display of the remote desktop 302 on top of the local desktop 402 may be provided on the display screen 220. Various display configurations and capabilities may be provided.

The remote desktop client installed at the user device 146 may use one or more VDI connections 208 to establish and conduct a remote desktop session with the VDI at an agent side 218. One or more connection servers 216 at the agent side 218 may manage these connections to the remote desktops 126 (e.g., for brokering communications, load balancing purposes, etc.).

At the agent side 218, the remote desktop 126 may provide remote applications installed/running thereon (e.g., the guest applications 124 of FIG. 1). These applications on the remote desktop 126 may include an APP-4 210, an APP-5 212, an APP-6 214, etc. These applications (e.g., their respective icons or launched files/interfaces) may in turn be presented on the remote desktop 126 rendered on the display screen 300 or 148 of the user device 146 (e.g., the remote desktop 302), when the user device 146 accesses the remote desktop 126. In some embodiments, one or more of the APP-4 210, an APP-5 212, an APP-6 214, etc. may be a browser, multimedia player, online meeting platform, communication application, electronic game, email application, word processing application, or other type of application or tool capable to provide content that can be displayed transparently.

Figure 8:
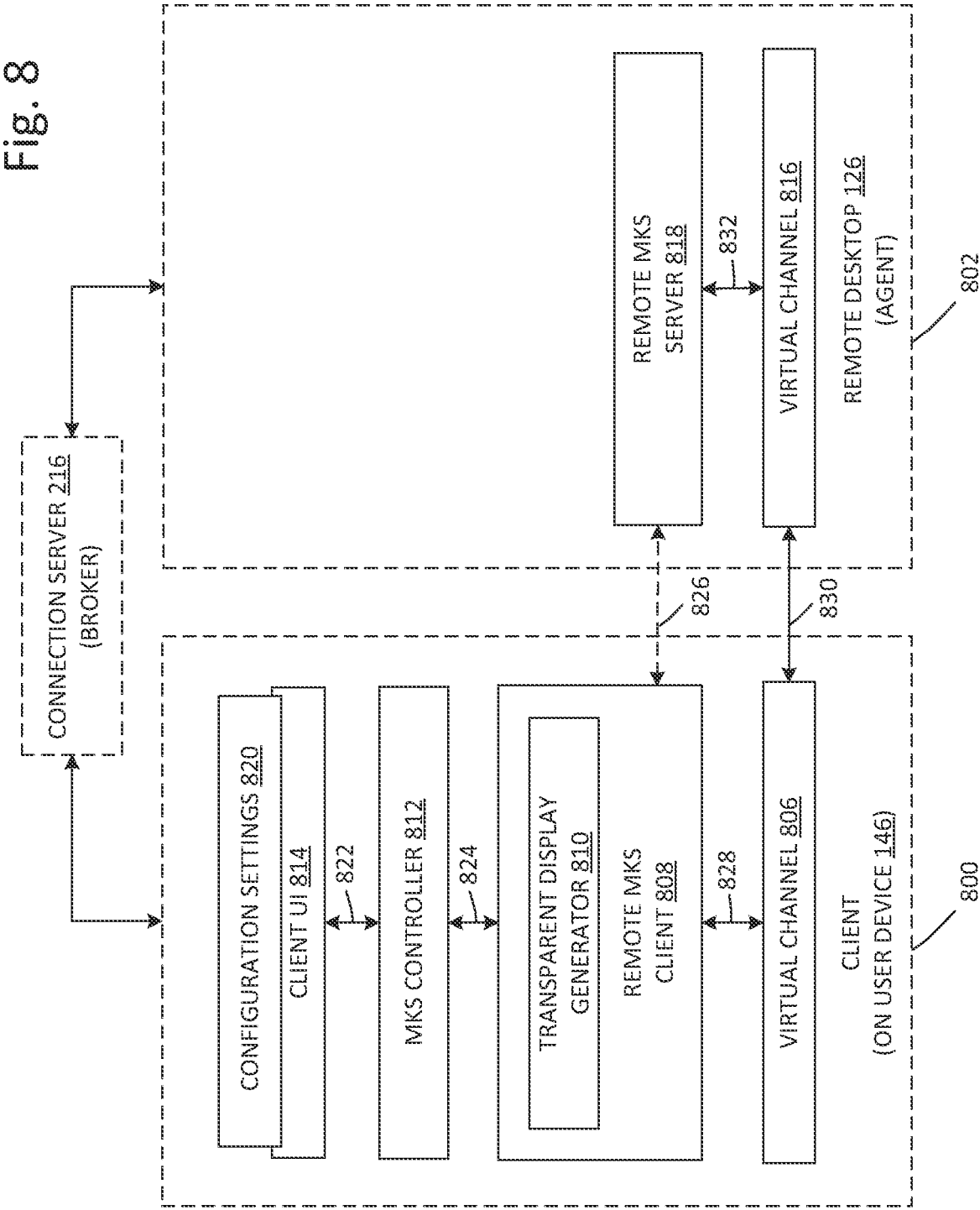
FIG. 8 is a schematic diagram illustrating components of a client and agent that cooperate to enable presentation of a remote desktop with controllable transparency.

Client and Agent for Presentation of a Remote Desktop with Controllable Transparency FIG. 8 is a schematic diagram illustrating components of a client and an agent that cooperate to enable presentation of a remote desktop with controllable transparency. More specifically, FIG. 8 shows example components of a remote desktop client 800 (e.g., a Horizon client or other analogous remote desktop client), a remote desktop agent 802 (e.g., a Horizon agent or other analogous remote desktop agent), and other components/devices of FIG. 2 that may support the capability to present a remote desktop (e.g., the remote desktop 302) with controllable transparency on a display screen (e.g., the display screen 300) such as depicted in FIGS. 5 and 6 above. Various components of the client, agent, etc. of FIG. 8 may be embodied as software or other computer-readable instructions stored on computer-readable media and executable by one or more processors, may be embodied in hardware, and/or may be embodied as a combination of hardware and software.

The client 800 may reside on the user device 146 at the client side. The agent 802 resides on a host at the agent side and is configured to provide one or more remote desktops 126 (e.g., the remote desktop 302) and related functionality to the client 800. The connection server 216 operates to broker communications between the agent 802 and the client 800.

The client 800 may comprise, among other things, various components such as a virtual channel 806, a remote mouse-keyboard-screen (MKS) client 808, a transparent display generator 810, a MKS controller 812, and a client UI 814. The agent 802, may comprise, among other things, various components such as a virtual channel 816, a MKS server 818, etc.

Configuration settings 820 may be provided/specified using the UI window 700, and are accessible and used by the client UI 814. In some embodiments, the client UI 814 may include or provide the UI window 700. As previously described above, the user may provide the configuration settings 820 (via the UI window 700) to enable/disable the presentation of the remote desktop 302 with controllable transparency, as well as to specify other configuration details such as the transparency level of the remote desktop 302, the hotkeys to turn on/off the presentation of the transparent remote desktop 302, to increase/decrease the transparency of the remote desktop 302, to change/control the direction of inputs (e.g., mouse and keyboard events), and other configuration details. The configuration settings 820 may be stored locally at the user device 146, and so users may perform re-configuration if some other local client device is used for remote desktop sessions.

If the user specifies or changes the configuration settings 820, such as by using the UI window 700 to make selections, edits, inputs, etc. and then clicking the OK button 712, the MKS controller 812 may be notified of such changes, selections, or other inputs at 822 via the client UI 814. The MKS controller 812 then coordinates (at 824) with the transparent display generator 810 to apply the configuration settings 820 that have been made by the user.

According to various embodiments, the MKS controller 812 may be configured to perform operations associated with controlling the presentation of the remote desktop 302 with controllable transparency. Such operations performed by the MKS controller 812 to coordinate with other components of the client 800 to present the remote desktop 302 may include one or more of the following:

1. Apply the configuration settings 820 provided (at 822) via the client UI 814 by working with the transparent display generator 810. For example, if the user enables/disables the presentation of the transparent remote desktop 302 via the UI window 700, the MKS controller 812 informs (at 824) the transparent display generator 810 to start/stop to generate the transparent remote display (remote desktop image) according to the transparency specified by the user. If the user modifies the image transparency (such as via hotkeys), the client UI 814 informs (at 824 via the MKS controller 812) the transparent display generator 810 to generate an image of the remote desktop 302 based on the newly changed transparency.

2. When the user uses hotkeys to enable/disable the presentation of the transparent remote desktop 302, or to increase/decrease the transparency, the MKS controller 812 monitors and identifies the keyboard and mouse operations/events, and handles these events appropriately. For example, if the user uses the CTRL+ALT+arrow up keys to increase the image transparency, each time that the user presses these hotkeys, the transparency may be increased by some amount (e.g., 5%), and the changes are sent (at 824) to the transparent display generator 810 to apply the changes.

3. Change the direction of user inputs, such as keyboard, mouse, touchscreen, etc. events, all collectively referred to herein as mouse and keyboard events. When the user presses hotkeys to switch the direction of input between the remote desktop and the local desktop, the MKS controller 812 checks/determines the current direction. If the mouse and keyboard events are currently being directed/redirected to the remote desktop, the MKS controller 812 notifies (in response to the hotkeys being pressed) the client 800 to ignore subsequent mouse and keyboard events so that these events can go to the underlying local application(s) on the local desktop 402. If mouse and keyboard events are currently being ignored by the client 800, the MKS controller 812 (in response to the hotkeys being pressed) lets subsequent mouse and keyboard events go to the remote MKS client 808 so that these events can be directed/redirected to the remote desktop 302. Thus, the pressing of such hotkeys can be analogous to turning off/on a filter for mouse and keyboard events, for purposes of passing these events to the local desktop or capturing these events for the remote desktop.

According to various embodiments, the transparent display generator 810 is implemented with the remote MKS client 808, and is configured to convert the original image frames of the remote display received from the remote desktop (agent 802) to transparent image frames based on the transparency defined by the user in the settings 820 provided by the UI window 700 of the client UI 814. When the user actuates hotkeys to increase/decrease the transparency, the transparent display generator 810 is informed (at 824) of the new change(s) and generates transparent graphical data of the remote display accordingly. Each time the user presses these hotkeys, the transparency will be increased/decreased by 5% or by some other transparency amount.

The remote MKS client 808 is configured to work with the remote MKS server 818 at the agent 802, so as to transfer (at 826) MKS-related data between them. In some embodiments, the transfer of the MKS-related data and/or other data, files, instructions, graphics, content, etc. between component(s) of the client 800 and component(s) of the agent 802 may occur at 828, 830, and 832 via the virtual channels 806 and 816, or via some other communication path(s).

With regards to the components of the agent 802, the remote MKS server 818 is configured to work (at 826) with the remote MKS client 808 at the client 800 to control the transfer of MKS-related data, as explained above. The virtual channels 816 and 818 of various embodiments may be one or more data channels established between the agent 802 and client 800 for transferring data, such as graphical data of the remote display, keyboard events, mouse events, files, audio/video streams, etc.

Figure 9:
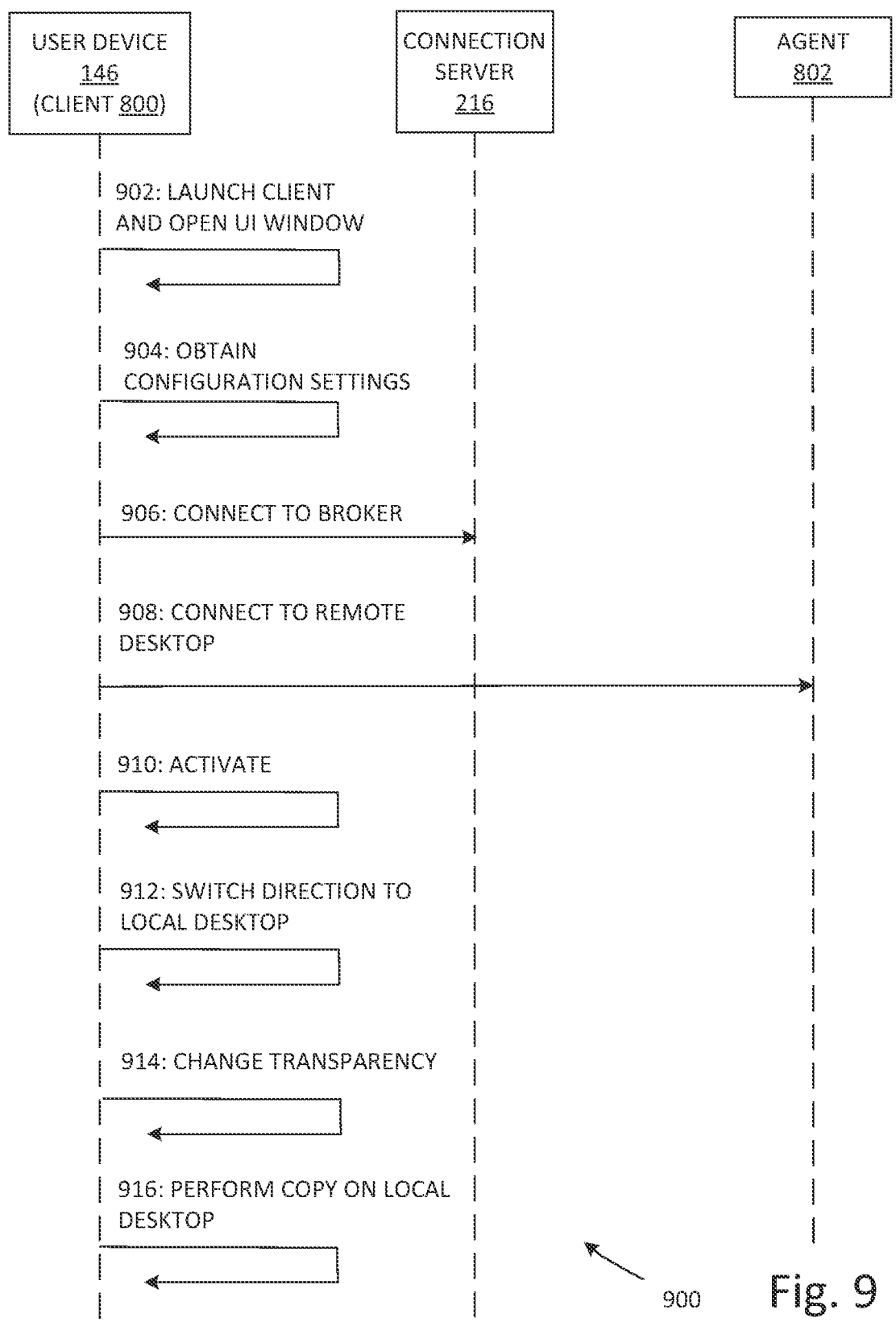
FIGS. 9 and 10 are flow diagrams of an example method to present a remote desktop with controllable transparency on a display screen.
Figure 10:
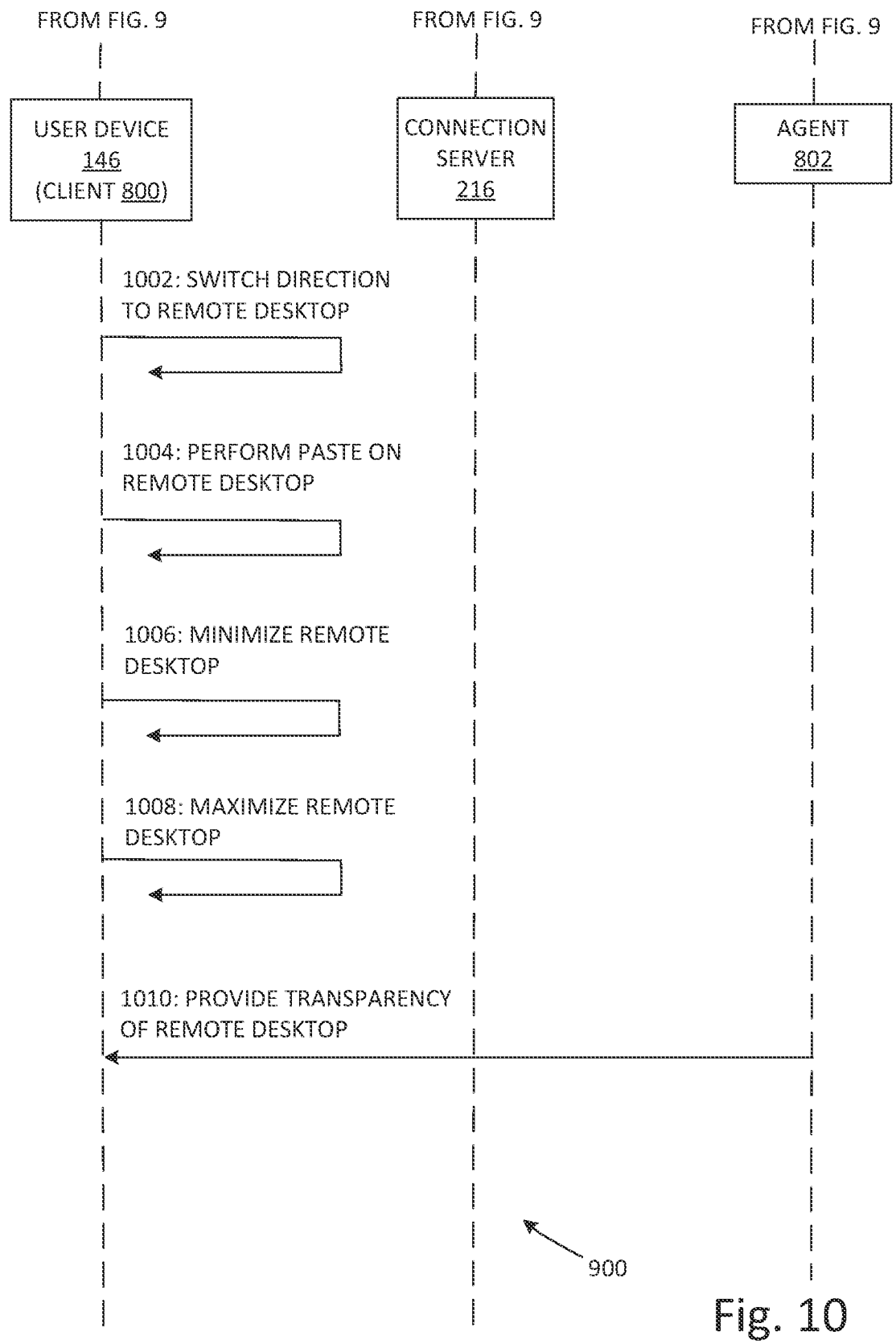

FIGS. 9 and 10 are flow diagrams of an example method 900 to present a remote desktop with controllable transparency on a display screen. More specifically, the method 900 may be performed to present the remote desktop 302 on top of the local desktop 402 on the display screen 300, such as depicted in the examples of FIGS. 5 and 6, with controllable transparency.

The example method 900 may include one or more operations, functions, or actions illustrated at 902 to 1010, in which the operations of FIG. 9 continue into FIG. 10. The various operations of the method 900 and/or of any other process(es) described herein may be combined into fewer operations, divided into additional operations, supplemented with further operations, and/or eliminated based upon the desired implementation. In one embodiment, the operations of the method 900 and/or of any other process(es) described herein may be performed in a pipelined sequential manner. In other embodiments, some operations may be performed out-of-order, in parallel, etc. The operations in the method 900 are described below with reference to the various components shown in FIGS. 1-8.

According to one embodiment, the method 900 may be performed by the client 800, in cooperation with at least one agent (e.g., the agent 802) and the connection server 216 for some operations. In other embodiments, various other elements in a computing environment may perform, individually or cooperatively, the various operations of the method 900.

At 902 ("LAUNCH CLIENT AND OPEN UI WINDOW"), the client 800 is launched at the user device 146, and the user opens the UI window 700 on the display screen 148 (e.g., the display screen 300) of the user device 146, so as to specify some of the configuration settings 820. For example and as previously explained above, the user may access and use the UI window 700 to provide the configuration settings 820 to the client 800, at 904 ("OBTAIN CONFIGURATION SETTINGS"), so as to enable/disable the presentation of the remote display 302 with controllable transparency, to specify the transparency of the remote display 302, to specify hotkeys for activating the feature, for increasing/decreasing the transparency, for changing the direction of mouse and keyboard events, and other configuration details.

At 906 ("CONNECT TO BROKER"), the client 800 connects to the connection server 216 that is operating as a broker, so as to initiate a remote desktop session between the client 800 and the agent 802, in which the remote desktop 126 is rendered on the display screen 300 as the remote desktop 302. For example, the client 800 may provide credentials to the connection server 216 to indicate that the client is entitled/authorized to access one of the remote desktops(s) provided by a VM, and then retrieves one of the remote desktops 126.

At 908 ("CONNECT TO REMOTE DESKTOP"), the client 800 is connected to the remote desktop (e.g., the agent 802) via the VDI connection 208, and the remote desktop 302 is rendered on the display screen 300. At 908, the user then operates the remote desktop 302 to perform work, such as using a remote application 124 provided via the remote desktop 302. The remote desktop 302 at this state may have zero transparency (e.g., fully visible), and is fully covering the local desktop 402 and the local application(s) on the display screen 300.

At 910 ("ACTIVATE"), the user wishes to display the remote desktop 302 on top of the local desktop 402 in a transparent manner. Therefore, the user can use hotkeys to activate this feature. For example, the user might press the CTRL+ALT hotkeys, which causes the transparency of the remote desktop 302 to change from zero transparency to the transparency specified in the configuration settings 820, such as 50% transparency. At this state, the user can now see the local application(s) of the local desktop 402 that were previously fully covered (obfuscated) by the remote desktop 302 prior to activation of the feature.

At 912 ("SWITCH DIRECTION TO LOCAL DESKTOP"), the user may wish to perform an operation on the local desktop 402, and so presses the appropriate hotkeys so as to send a first signal to switch the direction of mouse and keyboard events to the local desktop 402 instead of the remote desktop 302. When this switch is completed, the mouse and keyboard events are ignored by the client 800 and go instead to the underlying local application(s) of the local desktop 402 for processing.

At 914 ("CHANGE TRANSPARENCY"), the user can operate hotkeys to send a second signal to increase or decrease the transparency of the remote desktop 302. For example, the user may wish to make the image of the remote desktop 302 more visible or less visible, so as to get the best or optimum experience in viewing the remote desktop 302 and the local desktop 402 at the same time. The transparency may be changed regardless of the current direction mouse and keyboard events, in some embodiments.

At 916 ("PERFORM COPY ON LOCAL DESKTOP"), the user performs an operation (e.g., a mouse and keyboard event) on the local desktop 402 using the mouse, keyboard, touchscreen, or other input device. One example is a copy operation to copy some content from the local application or local desktop 402, such as text, images, files, folders, etc. to a clipboard or other storage location. The method 900 then moves to FIG. 10.

At 1002 ("SWITCH DIRECTION TO REMOTE DESKTOP"), the user switches the direction of mouse and keyboard events to the remote desktop 302 instead of the local desktop 402, such as by using hotkeys to send a third signal to initiate the switch. Thereafter, the mouse and keyboard events can be captured by the client 800 and then directed/redirected to the remote desktop 302.

At 1004 ("PERFORM PASTE ON REMOTE DESKTOP"), the user performs an operation on the remote desktop 302, such as a paste operation. With this paste operation, the content that was previously copied from the local desktop 402 (and which was saved in a clipboard redirection tool or other storage location) is pasted into the remote desktop 302. For example, the content may be pasted into an email that the user is composing using an email application provided by the remote desktop 302.

At 1006 ("MINIMIZE REMOTE DESKTOP"), the user minimizes the window of the remote desktop 302. The transparency of the remote desktop 302 is disabled or discontinued when the window of the remote desktop 302 is minimized or when the remote desktop 302 is not the topmost window on the display screen 300, so as to save local computing resources.

At 1008 ("MAXIMIZE REMOTE DESKTOP"), the user might decide to maximize the (currently minimized) remote desktop 302. Maximizing the remote desktop 302 causes the remote desktop 302 to again be displayed as the topmost window over the local desktop 402 and with the specified transparency level, at a block 1010 ("PROVIDE TRANSPARENCY OF REMOTE DESKTOP").

From the embodiments disclosed herein, several benefits are realized. For example, users may view the topmost remote desktop and the underlying local desktop at the same time, since the remote desktop is transparent. This avoids having to switch between viewing a single desktop one at a time. Furthermore, users can work with their remote desktop and their local desktop at the same time (e.g., can operate remote applications and local applications concurrently), even though there is only a single display screen to present both desktops.

Also, users may easily adjust the transparency of the remote desktop, so as to achieve the desired visual effect. Moreover, the user can easily control mouse and keyboard events that are being sent to the remote desktop (e.g., to a remote application) or to the local desktop (e.g., to a local application), so that the user can efficiently operate the remote desktop and local desktop. With the embodiments disclosed herein, the efficiency and experience with working remotely (or otherwise computing remotely) is substantially improved.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-10. For example, computing devices capable of acting as agent-side host devices or client-side user devices may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

The invention claimed is:

1. A method to present a remote desktop concurrently with a local desktop, the method comprising:
 displaying the remote desktop on a display screen, wherein the remote desktop is displayed over a local desktop on the display screen, wherein the remote desktop is visibly transparent, the remote desktop fully occupies the display screen and the local desktop fully occupies the display screen, and a visibly transparent user-selectable object in a task bar of the remote desktop is at least partially overlaid on a user-selectable object in a task bar of the local desktop that is visible therethrough;
 receiving a first signal to switch direction to the local desktop instead of the remote desktop, and correspondingly directing first user input to the local desktop;
 receiving a second signal to change transparency of the remote desktop, and correspondingly changing the transparency; and
 receiving a third signal to switch direction to the remote desktop instead of the local desktop, and correspondingly directing second user input to the remote desktop.

2. The method of claim 1, wherein the first, second, and third signals are received via actuation of hotkeys.

3. The method of claim 1, wherein the display screen is a primary display screen of a local client device that is logged into a remote desktop session that provides the remote desktop.

4. The method of claim 1, wherein the first and second user inputs include mouse and keyboard events, and wherein the events are respectively directed to the remote desktop or to the local desktop without minimizing either desktop.

5. The method of claim 1, wherein:
 a remote desktop client is installed in a local client device that provides the display screen that transparently displays the remote desktop over the local desktop;
 the first and second user inputs include mouse and keyboard events;
 if mouse and keyboard events are currently being directed to the remote desktop and in response to the first signal being received, first subsequent mouse and keyboard events are ignored by the remote desktop client and are directed to the local desktop for processing; and
 if mouse and keyboard events are currently being ignored by the remote desktop client and in response to the third signal being received, second subsequent mouse and keyboard events are captured by the remote desktop client and are directed to the remote desktop for processing.

6. The method of claim 1, wherein the first and third signals are initiated by consecutive mouse clicks on a same location of the display screen within a period of time, as a default setting.

7. The method of claim 1, wherein
 the remote desktop displayed on the display screen includes a visibly transparent window of an application that is provided by the remote desktop, and
 the local desktop displayed on the display screen includes a window of an application that is provided by the local desktop and visible through the remote desktop.

8. A non-transitory computer-readable medium having instructions stored thereon, which in response to execution by one or more processors, cause the one or more processors to perform a method to present a remote desktop concurrently with a local desktop, wherein the method comprises:
 displaying the remote desktop on a display screen, wherein the remote desktop is displayed over a local desktop on the display screen, wherein the remote desktop is transparent, the remote desktop fully occupies the display screen and the local desktop fully occupies the display screen, and a visibly transparent user-selectable object in a task bar of the remote desktop is at least partially overlaid on a user-selectable object in a task bar of the local desktop that is visible therethrough;
 receiving a first signal to switch direction to the local desktop instead of the remote desktop, and correspondingly directing first user input to the local desktop;
 receiving a second signal to change transparency of the remote desktop, and correspondingly changing the transparency; and
 receiving a third signal to switch direction to the remote desktop instead of the local desktop, and correspondingly directing second user input to the remote desktop.

9. The non-transitory computer-readable medium of claim 8, wherein the first, second, and third signals are received via actuation of hotkeys.

10. The non-transitory computer-readable medium of claim 8, wherein the display screen is a primary display screen of a local client device that is logged into a remote desktop session that provides the remote desktop.

11. The non-transitory computer-readable medium of claim 8, wherein the first and second user inputs include mouse and keyboard events, and wherein the events are respectively directed to the remote desktop or to the local desktop without minimizing either desktop.

12. The non-transitory computer-readable medium of claim 8, wherein:

a remote desktop client is installed in a local client device, that provides the display screen that transparently displays the remote desktop over the local desktop;

the first and second user inputs include mouse and keyboard events;

if mouse and keyboard events are currently being directed to the remote desktop and in response to the first signal being received, first subsequent mouse and keyboard events are ignored by the remote desktop client and are directed to the local desktop for processing; and if mouse and keyboard events are currently being ignored by the remote desktop client and in response to the third signal being received, second subsequent mouse and keyboard events are captured by the remote desktop client and are directed to the remote desktop for processing.

13. The non-transitory computer-readable medium of claim 8, wherein the first and third signals are initiated by consecutive mouse clicks on a same location of the display screen within a period of time, as a default setting.

14. The non-transitory computer-readable medium of claim 8, wherein
the remote desktop displayed on the display screen includes a visibly transparent window of an application that is provided by the remote desktop, and
the local desktop displayed on the display screen includes a window of an application that is provided by the local desktop and visible through the remote desktop.

15. A computing device, comprising:
a processor; and
a non-transitory computer-readable medium coupled to the processor and having instructions stored thereon, which in response to execution by the processor, cause the processor to perform operations to present a remote desktop concurrently with a local desktop, wherein the operations comprise:
display the remote desktop on a display screen, wherein the remote desktop is displayed over a local desktop on the display screen, wherein the remote desktop is visibly transparent, the remote desktop fully occupies the display screen and the local desktop fully occupies the display screen, and a visibly transparent user-selectable object in a task bar of the remote desktop is at least partially overlaid on a user-selectable object in a task bar of the local desktop that is visible therethrough;
receive a first signal to switch direction to the local desktop instead of the remote desktop, and correspondingly direct first user input to the local desktop;
receive a second signal to change transparency of the remote desktop, and correspondingly change the transparency; and
receive a third signal to switch direction to the remote desktop instead of the local desktop, and correspondingly direct second user input to the remote desktop.

16. The computing device of claim 15, wherein the first, second, and third signals are received via actuation of hotkeys.

17. The computing device of claim 15, wherein the display screen is a primary display screen of a local client device, being the computing device, that is logged into a remote desktop session that provides the remote desktop.

18. The computing device of claim 15, wherein the first and second user inputs include mouse and keyboard events, and wherein the events are respectively directed to the remote desktop or to the local desktop without minimizing either desktop.

19. The computing device of claim 15, wherein:
a remote desktop client is installed in a local client device, being the computing device, that provides the display screen that transparently displays the remote desktop over the local desktop;
the first and second user inputs include mouse and keyboard events;
if mouse and keyboard events are currently being directed to the remote desktop and in response to the first signal being received, first subsequent mouse and keyboard events are ignored by the remote desktop client and are directed to the local desktop for processing; and
if mouse and keyboard events are currently being ignored by the remote desktop client and in response to the third signal being received, second subsequent mouse and keyboard events are captured by the remote desktop client and are directed to the remote desktop for processing.

20. The computing device of claim 15, wherein the first and third signals are initiated by consecutive mouse clicks on a same location of the display screen within a period of time, as a default setting.

21. The computing device of claim 15, wherein
the remote desktop displayed on the display screen includes a visibly transparent window of an application that is provided by the remote desktop, and
the local desktop displayed on the display screen includes a window of an application that is provided by the local desktop and visible through the remote desktop.

\* \* \* \* \*